Feb. 5, 1952 G. A. LYON 2,584,143
WHEEL STRUCTURE
Filed Feb. 27, 1947

Inventor
GEORGE ALBERT LYON

UNITED STATES PATENT OFFICE 2,584,143

WHEEL STRUCTURE

George Albert Lyon, Detroit, Mich.

Application February 27, 1947, Serial No. 731,330

5 Claims. (Cl. 301—37)

This invention relates to improvements in a wheel structure and more particularly concerns novel vehicle wheel cover constructions and improved means for retaining the same upon a wheel.

An important object of the present invention is to provide a novel cover construction for vehicle wheels and improved means for retaining the cover upon the wheel.

Another object of the invention is to provide an improved wheel structure including novel means thereon for retaining an ornamental and protective cover in assembly with the wheel.

A further object of the invention is to provide an improved ornamental and protective cover for a vehicle wheel.

Still another object of the invention is to provide a novel composite cover construction for vehicle wheels.

According to the general features of the present invention, there is provided a vehicle wheel including a tire supporting rim and a load-sustaining body part concentric with the rim and formed with ventilation openings at spaced annular intervals at the juncture of the body part and the tire rim, the flanges defining the respective ventilation openings and having respective intermediately inset portions, and the wheel body carrying respective cover retaining clips having resiliently deflectable shoulder flange portions thereof extending in guided relation into the clearances afforded by the respective inset portions whereby to be held against rotating out of operative position and also to afford a backing for such shoulder portions against accidental overstressing.

Another feature of the invention resides in the provision of an annular cover-centering groove formed in the wheel body coincident with the principal diameter of the ventilation openings and radially outwardly of the inset portions of the ventilation opening flanges.

Yet another feature of the invention resides in the provision of a cover construction having a generally radially inwardly extending flange portion engageable in snap-on pry-off relation with the retaining clips and being held in centered relation by seating within the annular groove in the body portion of the wheel.

It is also a feature of the invention to provide a protective and ornamental cover for a vehicle wheel wherein the body of the wheel carries retaining spring clips generally radially outwardly and axially inwardly, the cover having a folded generally radially inwardly extending flat flange engaging with the spring clips and seated on the body of the wheel.

An additional feature of the invention resides in the provision of a composite cover construction for a vehicle wheel comprising separable components including a trim ring member and a hub cap member, wherein the trim ring member has a generally radially inwardly extending folded reinforcing flange adapted to seat upon the body of a wheel with which the cover is assembled, and the hub cap member is adapted for marginally engaging the folded reinforcing and seating flange in the fully assembled relationship of the cover components.

Other objects, features and advantages of the present invention will be readily apparent from the following detailed description of certain preferred embodiments thereof taken together with the accompanying drawings, in which.

As shown on the drawings.

Figure 1:
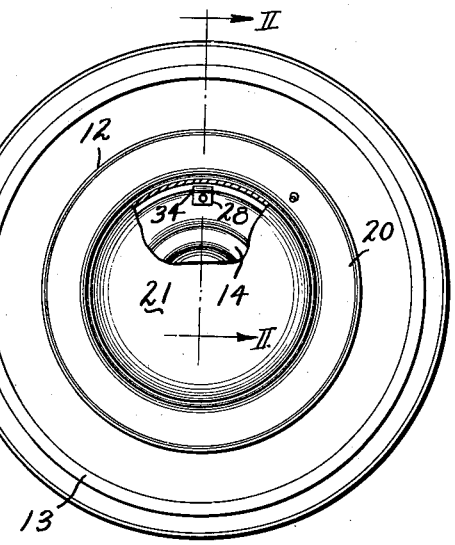
Figure 1 is a side elevational view of a wheel structure embodying features of the present invention with certain parts broken away and in section to reveal details of structure.

A wheel according to the present invention comprises a wheel body 10 and a tire rim 11 which may be formed separately from suitable gauge sheet metal, the wheel body being a stamping, and the tire rim being a rolled section.

The tire rim 11 may be of the conventional multi-flanged drop center type having the usual stepped side flanges terminating in an outer edge flange 12 and adapted to support a pneumatic tire and tube assembly 13.

The wheel body 10 is formed with an axially outwardly extending annular reinforcing bulge 14 and a central dished bolt-on flange structure 15 which is adapted to be secured by means of the customary cap screws or bolts to a part of the axle of a vehicle (not shown).

At uniform annularly spaced intervals, the wheel body 10 is formed at the juncture thereof with the tire rim 11 with ventilation openings 17 which are formed by radially inwardly inset portions of the radially outer periphery of the wheel body and defined by respective inset flanges 18.

An ornamental and protective outer side cover is provided for the wheel by a cover assembly 19 including an outer trim ring portion 20 and an inner hub cap portion 21.

The outer trim ring portion 20 of the cover is preferably of an extent and magnitude to substantially cover the outer side of the tire rim 11 and extends from adjacent to the outer terminal flange 12 of the tire rim to the wheel body 10 and radially inwardly of the juncture of the wheel body and the tire rim. The outer face of the trim ring cover portion 20 may be finished in any suitable fashion such as with a lustrous surfacing and it may be formed, as shown, on a cross sectional curvature substantially conforming to the side wall curvature of the tire. When colored white this substantially simulates an inner white side wall portion of a massive tire. The outer edge of the cover portion 20 is formed with a reinforcing bead 22 and extends to within a closely spaced relation to the radially inner side of the outer edge of the terminal flange 12 in such manner that a pry off tool can be applied between the terminal flange and the bead edge 22 when it is desired to remove the cover from the wheel.

At its inner margin, the trim ring cover portion 20 is formed with an axially outwardly humped annular reinforcing rib 23 and has the terminal portion of the inner margin formed as a generally radially inwardly extending flange 24 turned outwardly upon itself to provide a parallel clenching flange 25 affording a generally radially outwardly opening groove within which is clamped a generally radially inwardly extending marginal flange 27 on the hub cap portion 21. The juncture of the marginal flange 27 of the hub cap affords a shoulder which is nested in assembly with the groove formed at the juncture of the marginal flange 24 of the trim ring cover portion with the reinforcing rib 23. In this manner the cover portions 20 and 21 are securely fastened together into a solid unitary structure. The juncture afforded by the flanges 24, 25 and 27 provides a multi-layer, quite rigid radially inturned attachment flange structure which is highly advantageous in maintaining the cover portion against damaging distortion from any cause and affords means for seating the cover against the wheel body 10 as well as an attachment flange engageable in snap-on pry-off relation with resilient retaining clips 28 carried by the wheel body 10.

According to the present invention, the retaining clips 28 are provided as an annularly spaced series corresponding in number with the ventilation openings 17. Each of the clips 28 is preferably formed of a resilient sheet metal strip of substantial width and having a base flange 29 as its radially inner terminal portion secured as by means of a rivet 30 to the reinforcing bulge 14 of the wheel body. From the radially outer end of the base 25 the clip extends goose-neck fashion as indicated at 31 to a rounded juncture with a generally axially inwardly and radially outwardly obliquely extending cam and tensioning intermediate flange portion 32 which terminates in a generally axially inwardly and radially inwardly obliquely extending shoulder flange 33.

The shoulder flange 33 in each instance, is so disposed that it extends into a radially inwardly inset clearance 34 provided therefor in the associated ventilation opening flange 18. The width of the clearance inset 34 is just wide enough to afford free clearance for springing movement of the shoulder flange 33 of the retaining clip and to retain the shoulder flange 33 against lateral movement, that is movement which would permit the clip to swing out of proper operative position.

The inset portion of the ventilation opening flange 18 is spaced far enough radially inwardly from the shoulder flange 33 of the clip to permit an adequate range of radial springing movement thereof but affords a backing for the flange should the clip be unusually compressed, as might occur accidentally when the wheel is demounted and is dropped haphazardly on its side while the cover 19 is off. This might overstress and damage the clip were it not for the backing provided by the inset flange portion which limits the radially inward stressing or deflection of the clip.

The hump afforded at the juncture of the tensioning flange 32 and the shoulder flange 33 of the clip extends radially outwardly to a circle on a greater diameter than the diameter at the inner edge of the composite attachment flange of the cover 19. Thus, when the cover is pushed axially inwardly with the composite attachment flange pressing against the tensioning flanges 32 of the clip the cover flange will cam axially inwardly and compress the clip until the cover flange passes the hump juncture of the clip flanges and comes to rest against the wheel body with the shoulder flange 33 of the clip snapped into resilient retaining engagement with the axially outer side of the edge of the composite attachment flange of the cover.

Removal of the cover is effected by a pry-off force which may be applied, as previously described, to the outer edge of the trim ring cover portion 20 by means of a suitable pry off tool (not shown) to force the composite attachment flange of the cover past and out of engagement with the retaining clips 28.

In order to maintain the cover concentric with the wheel, the radially outer side of the wheel body hump 14 is formed with an annular centering groove 35 which is preferably formed coincident with the principal diameter of the ventilation opening flanges 18 and radially outwardly of the inset clearances 34. Thus, the edge of the attachment flange of the cover comes to rest in the seat provided by the groove 35 at the most efficient point with respect to the retaining clips 28. At the same time, ample space is afforded radially inwardly from the groove 35 at the insets 34 to permit self-centering of the retaining clips and freedom of operational flexing movements thereof.

Figure 2:
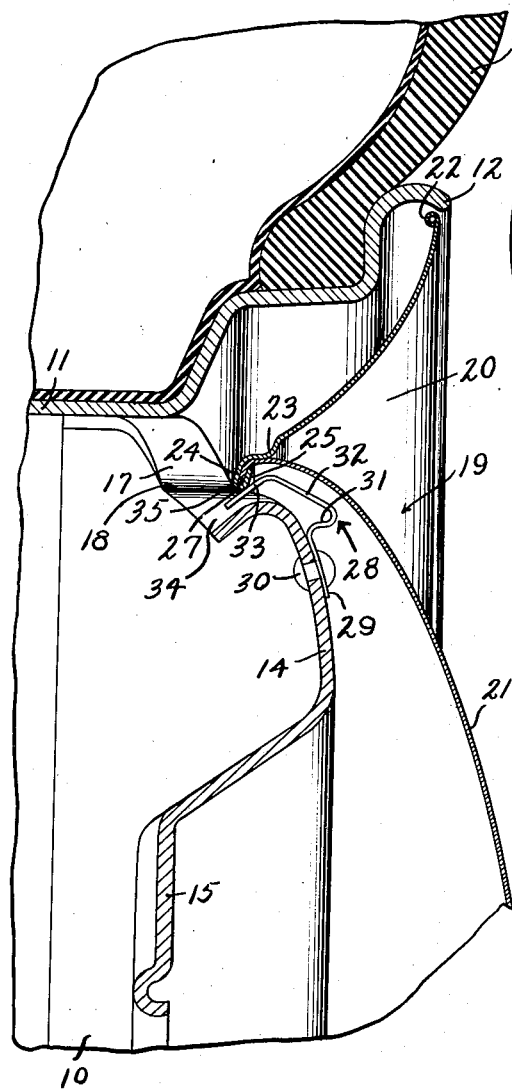
Figure 2 is a radial sectional view on an enlarged scale taken substantially along the line II—II of Fig. 1.
Figure 3:
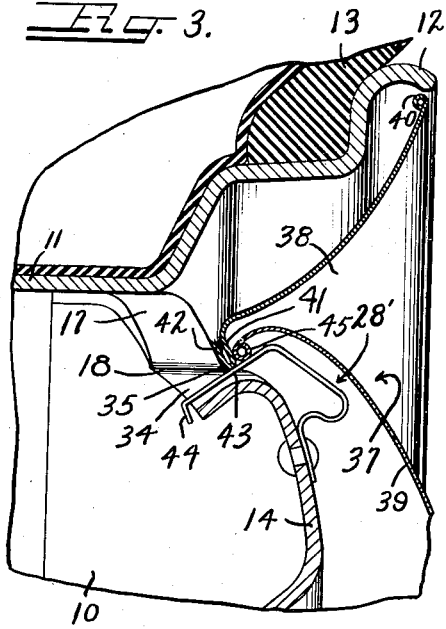
Figure 3 is a similar sectional view as Fig. 2 but showing a modified form of construction.

In the modified construction shown in Fig. 3, the structural details of the wheel are identical with those shown in Figs. 1 and 2 and similar reference numerals are applied. However, a somewhat modified form of cover 37 has been provided in this form which comprises separable trim ring and hub cap portions 38 and 39, respectively. Through this arrangement the trim ring and hub cap portions are independently replaceable when that becomes desirable and they can be separately applied to the wheel, and the hub cap portion may be used independently of the trim ring and may also be removed without removing the trim ring.

The trim ring portion 38 is of a magnitude and extent to cover the outer side of the tire rim and has a bead reinforced outer edge 40. From the bead 40 the portion 38 extends radially and axially inwardly to engage the wheel body radially inwardly from the juncture of the tire rim and the wheel body. At its inner margin the trim ring portion 38 is formed with a generally radially inwardly extending reinforcing flange 41 which is preferably return bent inwardly to provide a reinforcing and seating flange 42. The flange 41 is of an inside diameter to seat in the wheel body centering groove 35 and to be engaged in snap-on pry-off relation by respective shoulder flanges 43 of retaining clips 28'.

The retaining clips 28' are in major respects the same as the clips 28 previously described except that the shoulder flanges 43 thereof are formed longer so as to extend axially inwardly beyond the inner edge of the clearance inset portions of the respective ventilation opening flanges 18 and have at their terminals generally radially inwardly extending respective terminal limit flanges 44 which are adapted to engage the adjacent edge of the inset portion of the ventilation flange to restrain the clip against undue axially outward flexure.

The hub cap cover portion 39 is formed with a generally radially inwardly extending beaded edge 45 which is proportioned to be engaged in snap-on pry-off relationship with the clips 28' and seat against the seating and reinforcing flange structure 41 of the trim ring cover portion 38 to assist in retaining said trim ring portion in place and ornamentally cooperating therewith.

The width of the inner marginal flange 41 of trim ring portion 38 is preferably such that an adequate space is afforded between the margin of the hub cap cover portion 39 and the adjacent body portion of the trim ring so that a pry-off tool can conveniently be inserted therebetween for prying the hub cap cover portion 39 free from the assembly without requiring the trim ring cover portion 38 to be removed. Through this arrangement, it will be apparent that the hub cap 39 can be removed as desired without necessity for removing the trim ring 38, and where desired the hub cap 39 can be used independently of the trim ring 38.

I claim as my invention:

1. A vehicle wheel including a tire supporting rim and a load-sustaining body part concentric with the rim and formed with ventilation openings at spaced annular intervals at the juncture of the body part and the tire rim, a flange defining each of the respective ventilation openings and each flange having a respective intermediate inset portion, and the wheel body carrying respective cover retaining clips having resiliently reflectable shoulder flange portions thereof extending in guided relation into the clearances afforded by the respective inset portions whereby to be held against rotating out of operative position and also to afford a backing for such shoulder flange portion against accidental overstressing.

2. A vehicle wheel including a tire supporting rim and a load-sustaining body part concentric with the rim and formed with ventilation openings at spaced annular intervals at the juncture of the body part and the tire rim, a flange defining each of the respective ventilation openings and each flange having a respective intermediate inset portion, and the wheel body carrying respective cover retaining clips having resiliently deflectable shoulder flange portions thereof extending in guided relation into the clearances afforded by the respective inset portions whereby to be held against rotating out of operative position and also to afford a backing for such shoulder flange portion against accidental overstressing, an annular cover-centering groove being formed in the wheel body coincident with the principal diameter of the ventilation openings and radially outwardly of the inset portions of the ventilation opening flanges.

3. A vehicle wheel including a tire supporting rim and a load-sustaining body part concentric with the rim and formed with ventilation openings at spaced annular intervals at the juncture of the body part and the tire rim, a flange defining each of the respective ventilation openings and each flange having a respective intermediate inset portion, the wheel body carrying respective cover retaining clips having resiliently deflectable shoulder flange portions thereof extending in guided relation into the clearances afforded by the respective inset portions whereby to be held against rotating out of operative position and also to afford a backing for such shoulder flange portion against accidental overstressing, an annular cover-centering groove being formed in the wheel body coincident with the principal diameter of the ventilation openings and radially outwardly of the inset portions of the ventilation opening flanges, and a cover construction having a generally radially inwardly extending flange portion engageable in snap-on pry-off relation with the retaining clips and being held in centered relation by seating within the annular groove in the body portion of the wheel.

4. In a cover construction of the character described, a trim ring cover portion extending generally radially and axially inwardly, a hub cap cover portion, the inner margin of the trim ring cover portion having a reinforcing rib and a generally radially inwardly extending flange joined with the rib to provide an axially outwardly and radially inwardly opening groove, the hub cap cover portion having a generally radially inwardly extending flange on its margin seated in said groove, and the inter marginal terminal portion of the trim ring cover being turned over into clamping engagement with said marginal flange portion of the hub cap cover portion.

5. As an article of manufacture a wheel cover adapted to be disposed at the outer side of a vehicle wheel including tire rim and load sustaining body portions, a trim ring member of a magnitude and extent to substantially cover the tire rim and the juncture portion of the tire rim and body portion, the radially outer margin of the trimming being strongly reinforced, said trim ring member extending from its outer edge generally radially and axially inwardly, the radially inner margin of the trim ring having an annular reinforcing rib spaced radially outwardly from the radially inner extremity of the trim ring, the radially inner extremity of the trim ring including a portion extending generally radially inwardly and a terminal flange portion folded back upon the radially inwardly extending portion and extending generally radially outwardly and defining with the radially inwardly extending portion a multi-layer inner marginal reinforcement and seating flange engageable against the wheel body in the assembled relationship of the cover with the wheel, and a circular inner cover member having a radially outer inturned generally radially inwardly extending marginal flange internested with said radially inwardly extending marginal portion of the trim ring at the radially inner side of said reinforcing rib and clampingly interengaged between said radially inwardly extending marginal portion and said turned-back radially outwardly extending terminal portion whereby the cover members are united into a unitary assembly.

GEORGE ALBERT LYON.

REFERENCES CITED

The following references are of record in the file of this patent:

UNITED STATES PATENTS

| Number | Name | Date |
|---|---|---|
| Re. 22,120 | Lyon | June 16, 1942 |
| 2,162,736 | Lyon | June 20, 1939 |
| 2,190,669 | Lyon | Feb. 20, 1940 |
| 2,196,718 | Ash | Apr. 9, 1940 |
| 2,214,746 | Lyon | Sept. 17, 1940 |
| 2,263,243 | Lyon | Nov. 18, 1941 |
| 2,306,631 | Lyon | Dec. 29, 1942 |
| 2,317,393 | Lyon | Apr. 27, 1943 |
| 2,368,243 | Lyon | Jan. 30, 1945 |
| 2,386,241 | Lyon | Oct. 9, 1945 |